United States Patent Office 3,266,788
Patented August 16, 1966

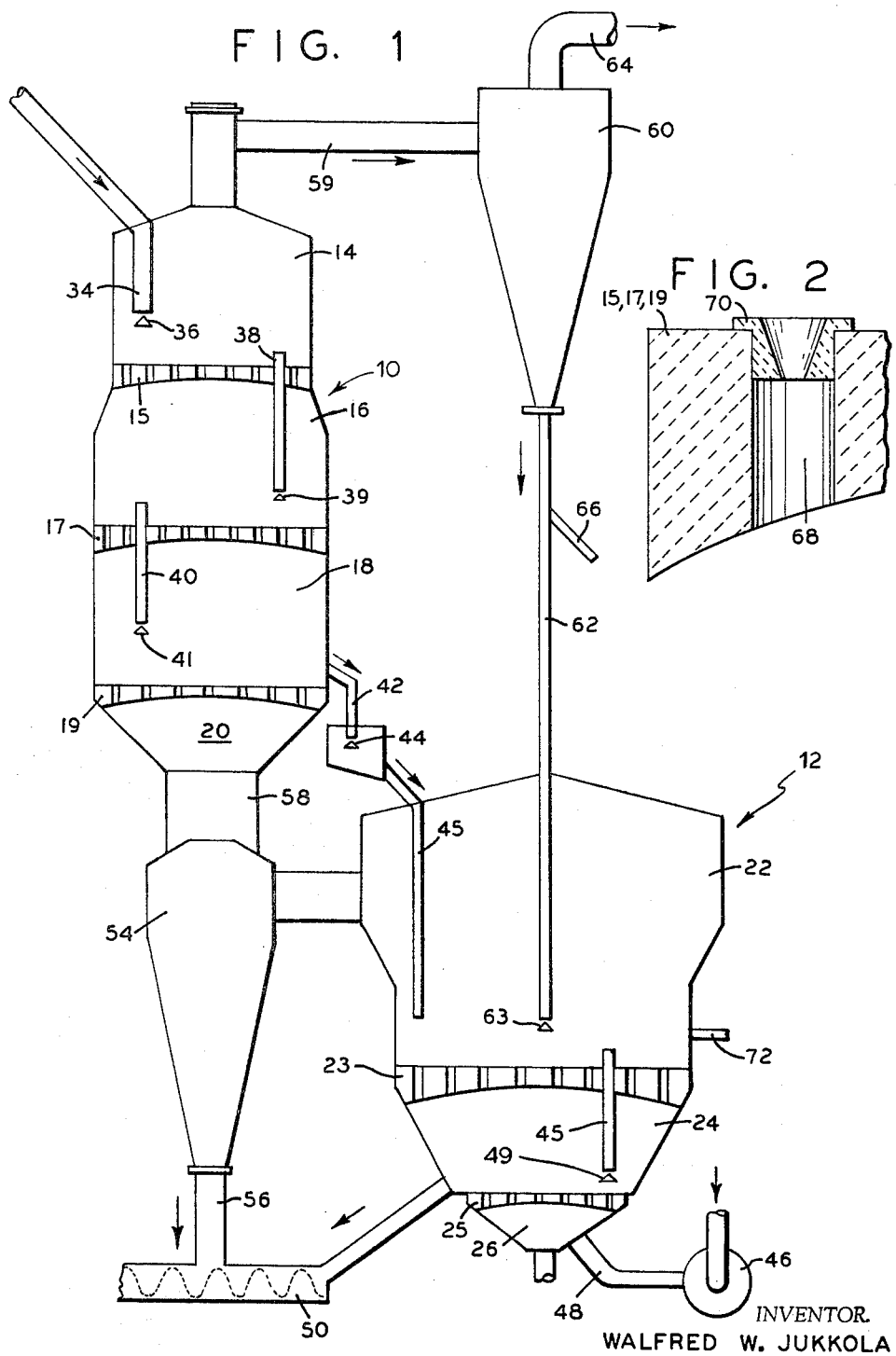

3,266,788
FLUIDIZED BED REACTOR AND METHOD OF OPERATING SAME
Walfred W. Jukkola, Westport, Conn., assignor to Dorr-Oliver Incorporated, Stamford, Conn., a corporation of Delaware
Filed July 16, 1964, Ser. No. 383,104
7 Claims. (Cl. 263—21)

This invention relates generally to fluidized bed reactors and more particularly to fluidized bed reactors which employ multi-compartments with dust collection systems between one or more of the fluidized stages.

It has been found that in the operation of commercial and pilot fluidized bed plants on certain substances, such as limestone and phosphate rocks, that the fines entrained from the calcining compartment have scaling properties which tend to plug up the orifices or tuyeres in the preheat compartment constriction plate. In order to alleviate this problem it is necessary to use the straight-through or sifting type of orifice in the preheat compartment constriction plate. The use of this type of orifice alleviated the problem of plugging of the orifices by the entrained fines from the calcining compartment but caused another problem in that the solids in the preheat chamber would drain into the inter-compartment windbox whenever the fluidized bed reactor is shut down. This necessitated frequent cleaning of the inter-compartment windbox by manual means which is time consuming, expensive and a very disagreeable task. Furthermore, the dust generated in the cleaning operation drifted into the air surrounding the reactor and is carried throughout the plant.

Therefore it is an object of this invention to provide a multicompartment fluidized bed reactor which does not allow the fines from the preheating compartment to remain in the inter-compartment windbox.

Another object of the invention is to provide a multi-compartment fluidized bed reactor which does not require constant cleaning.

Still another object of the invention is to provide a multicompartment fluidized bed reactor which operates on materials, the recovered fines of which tend to have scaling properties, that does not require constant cleaning of the inter-compartment windbox.

A still further object of the invention is to provide a multicompartment fluidized bed reactor in which the preheat and drying compartment is not in the same shell as the calcining and cooling compartment to eliminate the necessity of frequent cleaning of the inter-compartment windbox.

Other objects and advantages of the invention will be clearly apparent as the specification proceeds to describe the invention with reference to the accompanying drawing in which:

FIG. 1 is a diagrammatic representation of the herein disclosed novel fluidized bed reactor; and FIG. 2 is an enlarged cross-sectional view of a portion of the preheating compartment constriction plate of the straight-through or sifting type.

A fluidized bed reactor basically is a reactor or furnace, more or less vertical in type, divided by a transverse horizontally extending gas permeable constriction plate, into a gas receiving or windbox compartment beneath the plate and a solids heat-treatment zone or compartment thereabove. A bed of the solids to be treated is supported on the plate and fluidized by means of an oxygen-bearing gas or air delivered into the lower portion of the bed through the constriction plate with sufficient force whereby the pressure employed on the gas causes the solids to take on the appearance simulating boiling liquid within which a fluid level is presented and there is a constant change in position of the solid particles relative to each other whereby dust particles or solids in the finer form may rise within the flowing gaseous stream and thence upwardly from said body as outflowing suspended finer particles of dust into a freeboard or gas receiving space directly overlying the ever-changing body of solids.

Generally, fuel is supplied to the lower zone of the bed, either liquid or gaseous, to maintain combustion or oxidation therein. Solids are fed for treatment in the reactor into the upper zone of the bed. Calcined solids are discharged from the bottom section of the lower zone of the bed. Products of combustion are discharged from the top section of the compartment and can be discharged or used to preheat incoming solids. The herein described reactor or system is operable on a continuous basis. The above description is the typical fluidized bed system and generally applies to the hereinafter described improved fluidized bed reactor.

Looking now in particular to FIG. 1 the fluidized bed reactor basically consists of two shells 10 and 12. Shell 10 contains a plurality of preheat chambers 14, 16 and 18 separated by a constriction plate 15, 17 and 19 respectively, and an inter-compartment windbox 20. Shell 12 basically encompasses the calcining compartment 22, the cooling compartment 24 and a windbox 26 separated by constriction plates 23 and 25.

Solids to be treated are supplied to the top preheating chamber 14 by a suitable elevator not shown which receives the solids from the feed bin not shown, via suitable conveying means such as conveyor belts system which is well known in the art. The feed solids enter the top bed 14 through a feed inlet conduit 34 equipped with a control valve 36. The solids pass successively from preheat chamber 14 to preheat chambers 16 and 18 through suitable transfer conduits 38 and 40 respectively also provided with suitable valve means 39 and 41. The preheated solids in compartment 18 are delivered by gravity through solids feed inlet pipe 42 controlled by a suitable valve 44 into the calcination chamber 22, via conduit 45, to be reduced to calcine. From the calcining chamber 22 the treated solids are delivered by way of transfer conduit 45 into the cooling chamber 24 which is supplied with air from fan 46 via conduit 48. Conduit 45 is usually provided with valve means 49. The treated solids are then conveyed to any suitable storage area not shown such as by a screw conveyor 50.

The combustion and fluidizing air is introduced into the bottom windbox 26 by fan 46 and flows upward through the cooling compartment 24, the calcining compartment 22 and thereafter from the freeboard space of compartment 22 and into the hot cyclone 54 where most of the entrained fine solids are collected and discharged into the screw conveyor 50 by conduit 56 connected to the underflow of the cyclone 54. The spent fluidizing gases pass out of the overflow 58 of the hot cyclone and then pass successively through the inter-compartment windbox 20 and the preheat chambers 18, 16 and 14 wherein the incoming solids to be treated are preheated by the outgoing gas. From the top preheat chambers 14 the gases and entrained solids are delivered to an external dust system via conduit 59. The external dust system is represented as a cold cyclone 60 wherein the recovered solids are recycled to the calcining compartment 22 through conduit 62 connected to the underflow of the cyclone 60 and provided with a suitable valve means 63. The separated gas is then delivered to a secondary collection system (not shown) through conduit 64 connected to the overflow outlet of the cyclone 60. The underflow discharge from cyclone 60 may be alternately discharged to product via conduit 66, provided with a valve means not shown.

As previously discussed when handling and treating certain materials which generate fines which have scaling properties it is necessary to employ constriction plates in the preheat compartments which use straight-through or sifting type orifices as shown in detail in FIG. 2. Each of the constriction plates 15, 17 and 19 in the shell 10 are of the type shown in FIG. 2 with straight-through orifices 68 therethrough. The constriction plates 15, 17 and 19 are usually made of a refractory material and provided with tapered metal insert or tuyere 70 as shown. This type of orifice generally does not tend to be plugged due to scaling properties of the fines in gas passing therethrough but it is obvious that when the reactor is shut down the solids will fall through the orifices by gravity into the inter-compartment windbox 20 due to the relatively large opening in the tuyeres. In the normal fluidized bed reactor these solids would have to be manually cleaned out but it is obvious that in the herein disclosed system that upon shut down of the reactor the solids will fall into the windbox 20 but will pass therethrough and fall into the cyclone 54 from whence they can be readily handled in the external system without manual cleaning.

In operation the solids to be treated and the fluidizing air move generally in a countercurrent relationship with the finely divided solids entering preheat compartment 14 and passing successively through compartments 16 and 18 wherein they are preheated to about 1100° F. by the hot uprising exhaust gases from the calcination compartment 22. The preheated solids are thereafter transferred to the calcination compartment 22 where they are calcined and thereafter, the calcined solids are transferred to the cooling compartment 24 where they come in contact with relatively cool fluidizing air introduced via conduit 48. Fluidizing air enters the windbox 52 of the cooling compartment 24 with sufficient velocity to fluidize the solids in the cooling compartment and calcination compartment. The fluidizing air enters the reactor at a temperature generally lower than the temperature of the calcined solids and by direct heat exchange the solids in compartment 24 are cooled whereas the fluidizing air uprising therethrough is preheated. The preheated fluidizing air passes through constriction plate 23 and fluidizes the solids in the calcination compartment 22. The temperature of the calcination compartment is maintained in the range of about 1800° F. by combustion of fuel introduced directly into the calcination bed such as by a fuel gun, indicated generally by reference numeral 72. The hot fluidizing air and entrained fines pass out of the freeboard space of compartment 22 directly into a hot cyclone 54 wherein most of the entrained fines are separated and discharged via the apex or underflow discharge conduit 56. The exhaust gases, from which the fines have been separated, report to the overflow outlet and pass successively through windbox 20 compartments 18, 16 and 14 preheating the downwardly moving solids.

Although I have described in detail the preferred embodiment of my invention I contemplate that many changes may be made without departing from the scope or spirit of my invention, and I desired to be limited only by the claims.

I claim:

1. A reactor for the treatment of finely divided solids comprising: a first shell, a second shell, means forming a fluidized bed reaction chamber in said first shell, means forming a preheat chamber in said second shell, a windbox in said second chamber below said preheat chamber, means supplying fluidizing gas to said reaction chamber, means supplying finely divided solids to said preheat chamber, conduit means operably associated with said preheat chamber and said reaction chamber to supply finely divided solids to said reaction chamber from said preheat chamber, and cyclone separation means operably associated with said reaction chamber and said windbox located external of said reaction chamber and below said windbox whereby solids which fall into the windbox from said preheat chamber pass directly into said cyclone separation means.

2. The structure of claim 1 wherein the inlet means of said cyclone separation means is connected to the freeboard space of said reaction chamber and the overflow outlet means of said cyclone means is connected to the windbox.

3. The structure of claim 1 wherein said means forming a preheat chamber includes a constriction plate, said constriction plate having straight-through orifices therein for the passage of fluidizing gas from said reaction chamber to preheat the finely divided solids in said preheat chamber.

4. The structure of claim 1 wherein said second shell containing said preheat chamber is supported on said cyclone separation means.

5. The structure of claim 1 wherein said preheat chamber is comprised of a plurality of compartments, each of said compartments having a straight-through orifice type constriction plate supporting a bed of finely divided solids thereabove.

6. A reactor for the treatment of finely divided solids comprising: a first substantially cylindrical shell, a second substantially cylindrical shell, means forming a fluidized bed reaction chamber in said first shell, a windbox in said first shell under said reaction chamber, means forming a preheat chamber in said second shell, a second windbox in said second shell below said preheat chamber, a constriction plate extending across said shell and separating said second windbox from said preheat chamber, said constriction plate having straight-through orifices therein for the passage of a gas therethrough, means supplying finely divided solids to said preheat chamber, means transferring preheated finely divided solids from said preheat chamber to said reaction chamber, means supplying fluidizing gas into the windbox of said first shell and into said reaction chamber, and a cyclone separator located external of said first shell with its overflow connected to said second windbox and its inlet connected to the freeboard of said reaction chamber, said cyclone separator being located below said second windbox whereby finely divided solids which fall into said second windbox on shutdown of said reactor will fall into said cyclone separator.

7. A process for calcining finely divided solids comprising the steps of establishing and maintaining a fluidized reaction zone of finely divided solids, establishing and maintaining a fluidized preheating zone of finely divided solids, maintaining a separation zone between said reaction zone and said preheating zone, passing finely divided solids from said preheating zone to said reaction zone, countercurrently passing a fluidizing gas from said reaction zone to said preheating zone, through said separation zone wherein entrained solids in said fluidizing gas are separated, and allowing the finely divided solids from said preheat zone to fall into said separation zone when said process for calcining finely divided solids is discontinued.

References Cited by the Examiner

UNITED STATES PATENTS 2,659,587 11/1953 Bowen _____ 263—21
2,833,622 5/1958 Roberts et al. _____ 263—53 X
3,140,862 7/1964 Schoppe _____ 263—21

JOHN J. CAMBY, *Acting Primary Examiner.*